United States Patent
Samad et al.

(10) Patent No.: US 10,922,008 B2
(45) Date of Patent: Feb. 16, 2021

(54) SYSTEM AND METHOD FOR BACKUP OF VIRTUAL MACHINES ORGANIZED USING LOGICAL LAYERS

(71) Applicant: EMC IP Holding Company LLC, Hopkinton, MA (US)

(72) Inventors: Mohammed Samad, Bangalore (IN); Shelesh Chopra, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/504,847

(22) Filed: Jul. 8, 2019

(65) Prior Publication Data

US 2021/0011625 A1 Jan. 14, 2021

(51) Int. Cl.
*G06F 13/00* (2006.01)
*G06F 3/06* (2006.01)
*G06F 9/455* (2018.01)

(52) U.S. Cl.
CPC ............ *G06F 3/065* (2013.01); *G06F 3/067* (2013.01); *G06F 3/0619* (2013.01); *G06F 3/0664* (2013.01); *G06F 9/45558* (2013.01)

(58) Field of Classification Search
CPC ...... G06F 3/065; G06F 9/45558; G06F 3/067; G06F 3/0619; G06F 3/0664
See application file for complete search history.

(56) References Cited

U.S. PATENT DOCUMENTS

| | | | |
|---|---|---|---|
| 9,720,783 B1* | 8/2017 | Kulkarni | G06F 11/1461 |
| 9,817,739 B1* | 11/2017 | Pise | G06F 11/1484 |
| 10,346,193 B1* | 7/2019 | Dalal | G06F 12/0875 |
| 2014/0196038 A1* | 7/2014 | Kottomtharayil | G06F 9/505 718/1 |
| 2014/0196039 A1* | 7/2014 | Kottomtharayil | G06F 9/505 718/1 |
| 2019/0235967 A1* | 8/2019 | Sharma | G06F 3/0619 |
| 2019/0370128 A1* | 12/2019 | Sadavarte | G06F 3/0619 |
| 2020/0125262 A1* | 4/2020 | Hebsur | G06F 9/45558 |

* cited by examiner

*Primary Examiner* — Jing-Yih Shyu
(74) *Attorney, Agent, or Firm* — Chamberlain, Hrdlicka, White, Williams & Aughtry

(57) ABSTRACT

A method for performing backup operations includes identifying a plurality of virtual machines (VMs) to back up, grouping the plurality of VMs to obtain a plurality of VM groups, and initiating a configuration of a production agent on a production host associated with a first VM group of the plurality of VM groups, wherein the configured first production agent initiates a backup operation on at least the first VM group.

16 Claims, 8 Drawing Sheets

… (1)

SYSTEM AND METHOD FOR BACKUP OF VIRTUAL MACHINES ORGANIZED USING LOGICAL LAYERS

BACKGROUND

Computing devices may include any number of internal components such as processors, memory, and persistent storage. Each of the internal components of a computing device may be used to generate data and to execute functions. The process of generating, storing, and sending data may utilize computing resources of the computing devices such as processing and storage. The utilization of the aforementioned computing resources to generate data and to send data to other computing devices may impact the overall performance of the computing resources.

SUMMARY

In general, in one aspect, the invention relates to a method for performing backup operations. The method includes identifying a plurality of virtual machines (VMs) to back up, grouping the plurality of VMs to obtain a plurality of VM groups, and initiating a configuration of a production agent on a production host associated with a first VM group of the plurality of VM groups, wherein the configured first production agent initiates a backup operation on at least the first VM group.

In one aspect, the invention relates to a non-transitory computer readable medium in accordance with one or more embodiments of the invention, which includes computer readable program code, which when executed by a computer processor enables the computer processor to perform a method for performing backup operations. The method includes identifying a plurality of virtual machines (VMs) to back up, grouping the plurality of VMs to obtain a plurality of VM groups, and initiating a configuration of a production agent on a production host associated with a first VM group of the plurality of VM groups, wherein the configured first production agent initiates a backup operation on at least the first VM group.

In one aspect, the invention relates to a system in accordance with in one or more embodiments of the invention, which includes a processor and memory which includes instructions, which when executed by the processor, perform a method for performing backup operations. The method includes identifying a plurality of virtual machines (VMs) to back up, grouping the plurality of VMs to obtain a plurality of VM groups, and initiating a configuration of a production agent on a production host associated with a first VM group of the plurality of VM groups, wherein the configured first production agent initiates a backup operation on at least the first VM group.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing a backup operation. Embodiments of the invention manage the backup operation by identifying virtual machines in a system to be backed up, grouping the virtual machines based on a logical layer associated with each virtual machine, and configuring one or more production agents to back up the virtual machines based on the groupings. The production agents may be deployed to the production hosts to perform the backup operation in accordance with the configuration.

Further, embodiments of the invention relate to a method for updating a backup policy repository based on changes made to the system. The changes may include adding or removing an entity (e.g., a virtual machine, a component of a virtual machine, a logical layer, etc.) from the system, or modifying the entity to provide a different functionality. Embodiments of the invention may include identifying the change, determining whether the change impacts one or more backup policies of the backup repository, and if the change does impact a backup policy, updating the backup policy based on the change.

Figure 1A:
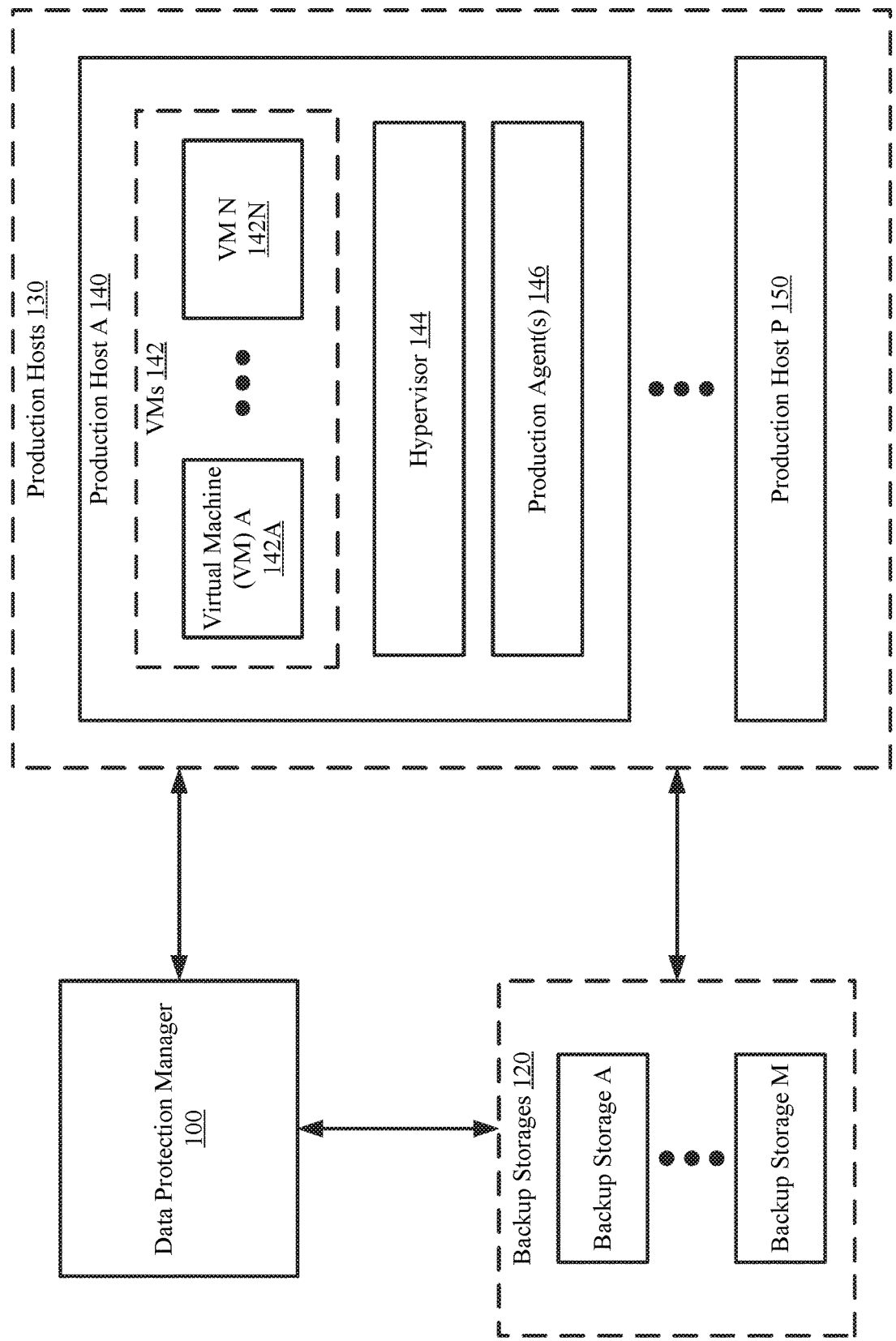
FIG. 1A shows a diagram of a system in accordance with one or more embodiments of the invention.

FIG. 1A shows an example system in accordance with one or more embodiments of the invention. The system includes a data protection manager (100), one or more production hosts (130) and backup storages (120). The system may include additional, fewer, and/or different components without departing from the invention. Each component may be operably connected to any of the other components via any combination of wired and/or wireless connections. Each component illustrated in FIG. 1A is discussed below.

In one or more embodiments of the invention, the data protection manager (100) manages the protection of data generated by the production hosts (130). The data protection manager may manage the protection of data by implementing backup policies for virtual machines (142) executing on the production hosts (140). The backup policies may specify how to back up the virtual machines (142) and to store the backups in the backup storages (120).

In one or more embodiments of the invention, the data protection manager (100) manages the protection of the data by implementing methods for restoring the virtual machines (142) using the backups stored in the backup storages (120).

Figure 4:
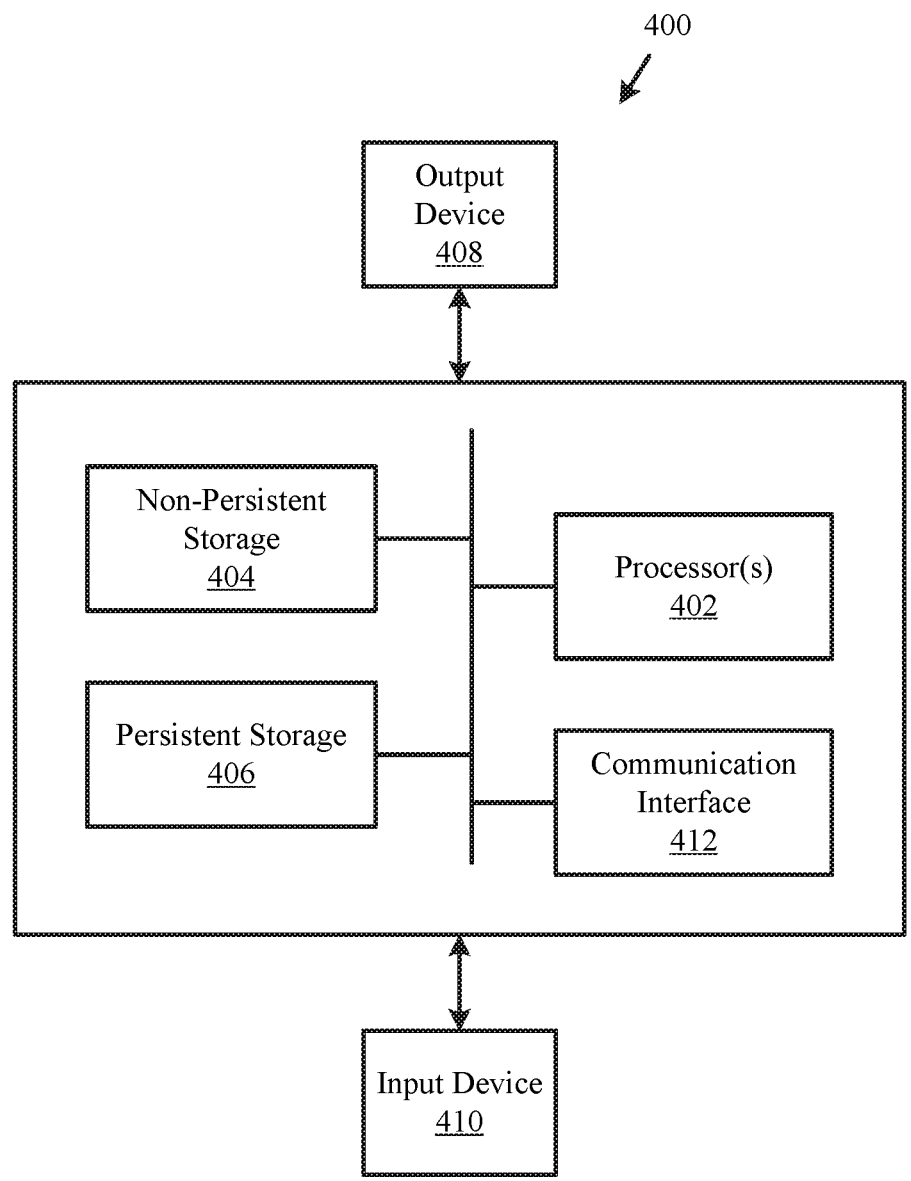
FIG. 4 shows a diagram of a computing device in accordance with one or more embodiments of the invention.

In one or more embodiments of the invention, the data protection manager (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data protection manager (100) described throughout this application and/or all, or a portion thereof, of the methods illustrated in FIGS. 2A-2B.

In one or more embodiments of the invention, the data protection manager (100) is implemented as a logical device. The logical device may utilize the computing resources of any number of computing devices and thereby provide the functionality of the data protection manager (100) described throughout this application and/or all, or a portion thereof, of the methods illustrated in FIGS. 2A-2B. For additional details regarding the data protection manager, see, e.g., FIG. 1C.

In one or more embodiments of the invention, the production hosts (130) host virtual machines (VMs) (142). The VMs (142) may be logical entities executed using computing resources (not shown) of the production host (130). Each of the virtual machines (142A, 142N) may be performing similar or different processes. In one or more embodiments of the invention, the VMs (142) provide services to users, e.g., clients (not shown). For example, the VMs (142) may host components. The components may be, for example, instances of databases, email servers, and/or other applications. The VMs (142) may host other types of components without departing from the invention.

Figure 1B:
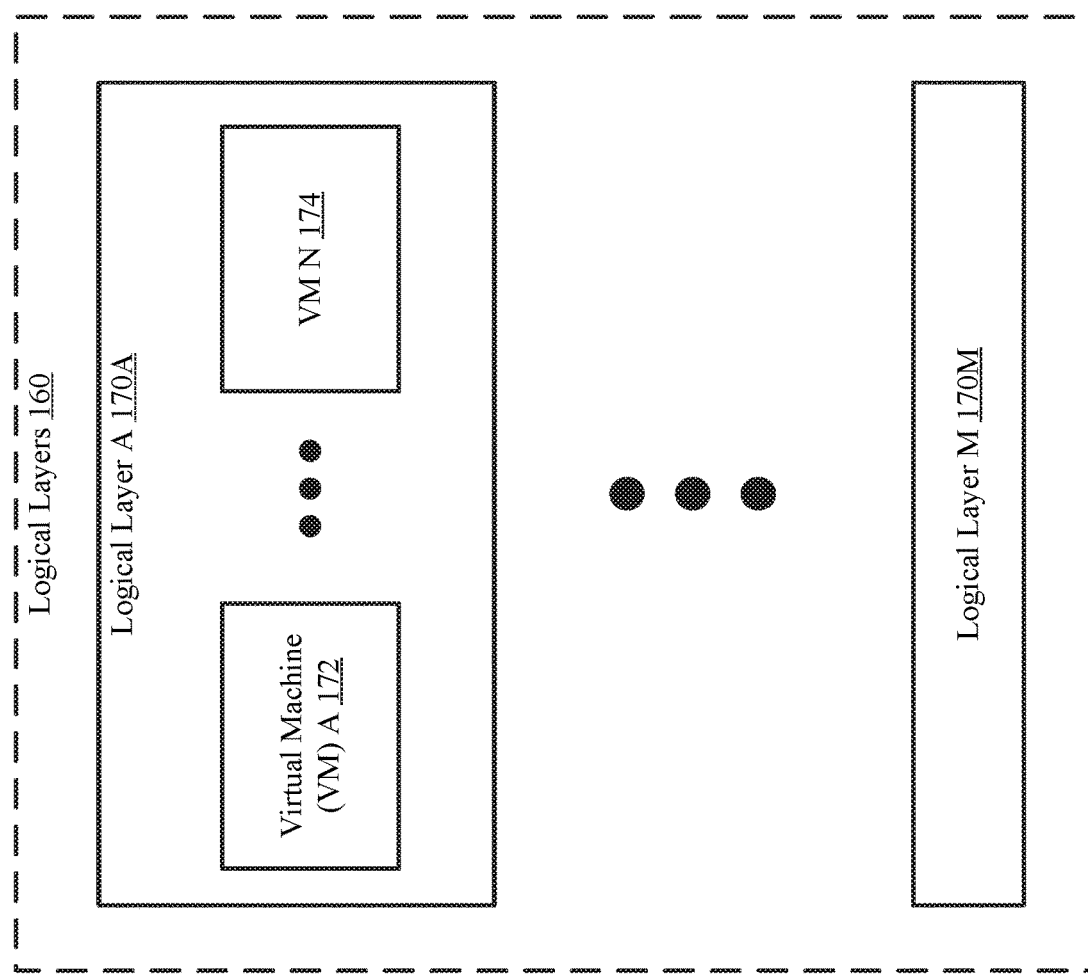
FIG. 1B shows a diagram of logical layers in accordance with one or more embodiments of the invention.

In one or more embodiments of the invention, the VMs (142) of the production hosts (130) are categorized based on logical layers (or VM groups) (see, e.g., FIG. 1B). In one or more embodiments of the invention, a logical layer is a logical grouping of virtual machines that is determined based on a functionality and/or interdependency of the VMs. For example, each logical layer includes one or more VMs that all perform a similar function. The function may be, for example, to provide databases and/or other computing resources to clients, to manage networking capabilities of the production hosts (130), to perform analytics of workloads implemented by virtual machines on the production hosts (130), to manage a cloud-based infrastructure of virtual machines, and/or any other functionalities without departing from the invention.

In one or more embodiments of the invention, the production hosts (130) each include a hypervisor (144) that orchestrates the operation of the VMs (142). The hypervisor (144) may orchestrate the operation of the VMs (142) by allocating computing resources to each virtual machine (142A, 142N).

Further, the hypervisor (144) may provide information about the virtual machines (142) of a production host (e.g., 140) to the data protection manager (100) as requested by the data protection manager (100), during periodic intervals, after a change in the system is detected by the hypervisor (144), and/or based on any other occurrence without departing from the invention.

In one or more embodiments of the invention, the hypervisor (144) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the hypervisor (144) described throughout this application.

In one or more of embodiments of the invention, the hypervisor (144) is implemented as computer instructions, e.g., computer code, stored on a persistent storage that when executed by a processor of the production host (140) cause the production host (140) to provide the functionality of the hypervisor (144) described throughout this application.

In one or more embodiments of the invention, the production host (140) includes one or more production agents (146). A production agent may include functionality for generating backups of one or more virtual machines (142A, 142N), storing the backups in the backup storages (120), and/or obtaining the backups from the backup storages (120) when restoring the virtual machines (142A, 142N).

In one or more embodiments of the invention, the production agent(s) (146) are installed by the data protection manager (100) and configured to perform the aforementioned functionality. The configuration performed by the data protection manager (100) may be based on backup policies implemented by the data protection manager (100). The data protection manager (100) may install the production agents (146) at a prior point in time and configure the installed production agents while implementing the backup policies. In one or more embodiments of the invention, the production agents (146) are installed by the data protection manger (100) while implementing the backup policies.

In one or more embodiments of the invention, the production agent (146) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the production agent (146) described throughout this application.

In one or more of embodiments of the invention, the production agent (146) is implemented as computer instructions, e.g., computer code, stored on a persistent storage that when executed by a processor of the production host (140) cause the production host (140) to provide the functionality of the production agent (146) described throughout this application.

In one or more embodiments of the invention, the virtual machines (142) are implemented as computer instructions, e.g., computer code, stored on a persistent storage (e.g., on a production host (140)) that when executed by a processor(s) of the production host (140) cause the production host (140) to provide the functionality of the virtual machines (142) described throughout this application.

In one or more embodiments of the invention, each of the production hosts (140, 150) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (140, 150) described throughout this application.

In one or more embodiments of the invention, each of the production hosts (140, 150) is implemented as a logical device. The logical device may utilize the computing resources of any number of computing devices and thereby provide the functionality of the production host (140, 150) described throughout this application.

In one or more embodiments of the invention, the backup storages (120) store backups of the virtual machines (142). The backup storages (120) may communicate with the production agents (e.g., 146) of each production host when obtaining backups to be stored and/or when transferring backups to the production hosts (130) when restoring virtual machines.

In one or more embodiments of the invention, the backups stored in the backup storages are backups. In one or more embodiments of the invention, a backup is a copy of data associated with a virtual machine. A backup may further include additional data that enables a production agent to restore a virtual machine associated with the backup from any production host.

In one or more embodiments of the invention, a transport mode is used to transfer a backup to the backup storage. In one embodiment of the invention, the transport mode corresponds to the manner in which data is transmitted from a production host (140, 150) to a backup storage (120). Examples of transport modes include, but are not limited to, network block device (NBD) and HotAdd.

In one or more embodiments of the invention, each of the backup storages (120) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage described throughout this application.

In one or more embodiments of the invention, each of the backup storages (120) is implemented as a logical device. The logical device may utilize the computing resources of any number of computing devices and thereby provide the functionality of the backup storage described throughout this application.

FIG. 1B shows a diagram of logical layers in accordance with one or more embodiments of the invention. The logical layers (160) may be logical groupings of virtual machines (e.g., 172, 174) based on, for example, a functionality of the virtual machines (172, 174). Each logical layer (170A, 170M) may include one or more virtual machines (172, 174) that perform the similar functionalities associated with each logical layer. The logical layers (170A) may be grouped via other methods without departing from the invention.

In one or more embodiments of the invention, the virtual machines (172, 174) of a logical layer (e.g., 170A) are hosted by similar production hosts (e.g., 130, FIG. 1A). In other words, each production host hosts virtual machines (172, 174) of one logical layer (170A).

In one or more embodiments of the invention, the production hosts host the virtual machines (172, 174) in a manner independent of the logical layers (160). In this manner, a production host may host virtual machines of different logical layers (170A, 170M).

Figure 1C:
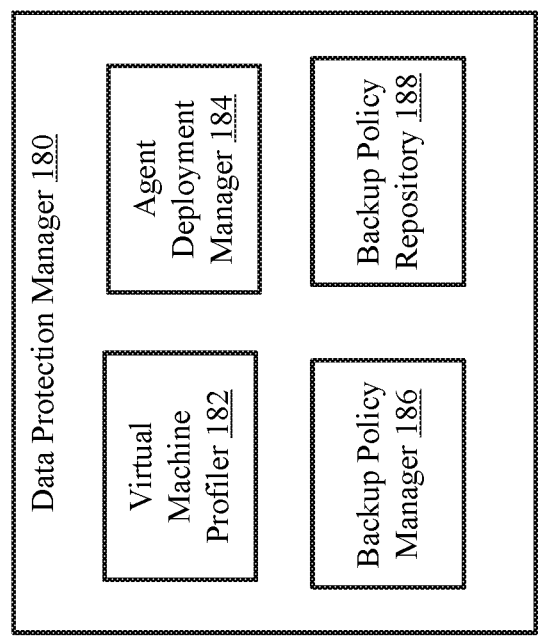
FIG. 1C shows a diagram of a data protection manager in accordance with one or more embodiments of the invention.

FIG. 1C shows a diagram of a data protection manager. The data protection manager (180) may be similar to the data protection manager (100, FIG. 1A) discussed above. As discussed above, the data protection manager (180) includes functionality for protecting the data generated by virtual machines. To perform the aforementioned functionality, the data protection manager (180) includes a virtual machine profiler (182), an agent deployment manager (184), a backup policy manager (186), and a backup policy repository (188). The data protection manager (180) may include additional, fewer, and/or different components without departing from the invention. Each of the aforementioned components of the data protection manager (180) is discussed below.

In one or more embodiments of the invention, the virtual machine profiler (182) obtains information about virtual machines. The virtual machine information may specify, for example, virtual machines, components of a virtual machines, and/or logical layers added and/or removed from the system of FIG. 1A, changes to a functionality of a virtual machine and/or logical layer, and/or other information about the system illustrated in FIG. 1A without departing from the invention.

The virtual machine information may be obtained using an application programming interface (API) that interacts with a component of the production host (e.g., a production agent and/or a hypervisor) executing on a production host. The component communicating with the virtual machine profiler (182) may perform a profiling on the virtual machines to obtain virtual machine information. The virtual machine information may be sent to the virtual machine profiler (182). The profiling may be performed periodically.

In one or more embodiments of the invention, the component sends an update to the virtual machine profiler (182) in which the update specifies VM information. The component may send it periodically and/or after a change is identified by the component.

In one or more embodiments of the invention, the agent deployment manager (184) initiates the deployment of production agents to the production hosts. The agent deployment manager (184) may initiate the deployment by configuring the production agents to perform a backup operation in accordance with backup policies. The agent deployment manager (184) may identify a backup policy that is to be implemented during a backup operation, install production agent(s) to a production host hosting the virtual machines (if the production agent(s) are not already installed), and configure the production agent(s) to perform the backup operation in accordance with the identified backup policy.

In one or more embodiments of the invention, the backup policy manager (186) updates a backup policy repository (188) based on virtual machine information obtained from the virtual machine profiler (182). The backup policy manager (186) may poll the virtual machine profiler (182) (e.g., periodically) for virtual machine information. The backup policy manager (186) may obtain a response from the virtual machine profiler (182). The response may specify the requested virtual machine information. The response may be used by the backup policy manager (186) to determine whether a backup of the backup policy repository (188) is to be updated.

In one or more embodiments of the invention, the backup policy manager (186) implements the backup policies of the backup policy repository (188) by triggering a backup request that is sent to a virtual machine profiler (182). The backup policy manager (186) may identify a point in time specified by a backup policy in which to perform a backup operation. The backup policy manager (186) may send a backup request at that point in time to the virtual machine profiler (182) to perform a backup operation in accordance with the backup policy.

In one or more embodiments of the invention, the backup policy repository (188) is a data structure that specifies backup policies of entities such as, for example, virtual machines, components of virtual machines, and/or logical layers. Each backup policy may specify the entity to be backed up using an identifier of the entity, a schedule for backing up the entity, a type of backup to be performed, and/or other information that may be useful for backing up the specified entity.

The other information may include, for example, whether a virtual machine is to be quiesced during a backup operation. In one or more embodiments of the invention, a virtual machine is quiesced when it is set to a state where it may not perform input/output operations (IOPS). One or more virtual machines may be set to a quiesced state during a backup operation to maintain consistency of a backup being generated during the backup operation. In one or more embodiments of the invention, a backup operation may be performed on a virtual machine without setting the virtual machine to a quiesced state.

Additionally, the other information may include, for example, specifying whether additional agents need to be installed in a virtual machine in order to perform a backup of the virtual machine. The additional agents may be used to back up applications executing on the virtual machine.

In one or more embodiments of the invention, each backup policy may be associated with a logical layer. In other words, a backup policy may apply to one or more virtual machines associated with a logical layer. The virtual machines may be specified in the backup policy.

Figure 2A:
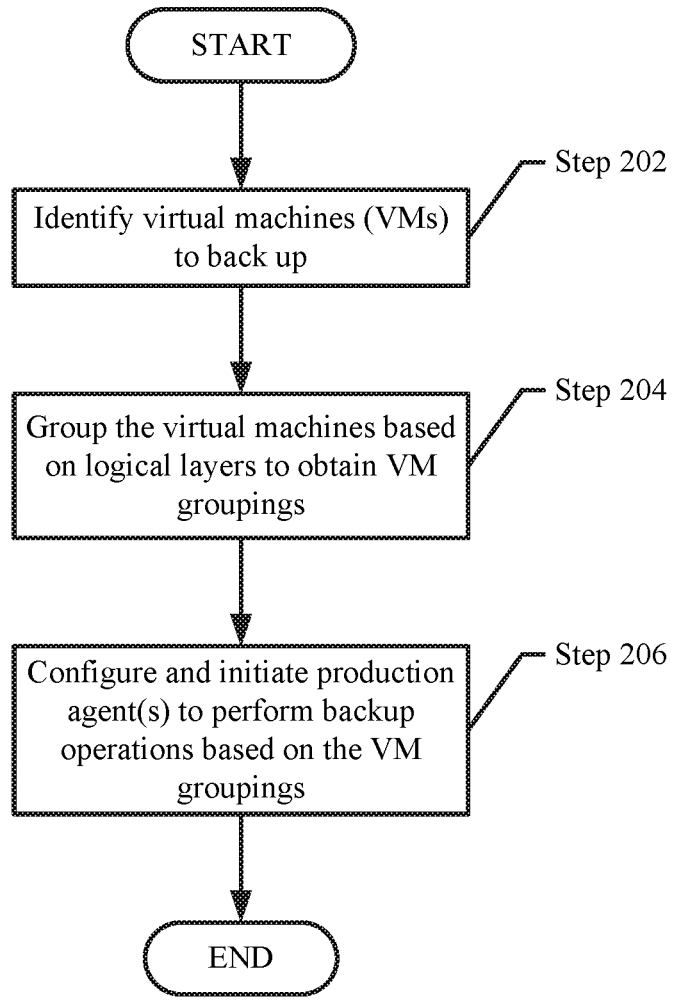
FIG. 2A shows a flowchart for managing backup requests in accordance with one or more embodiments of the invention.
Figure 2B:
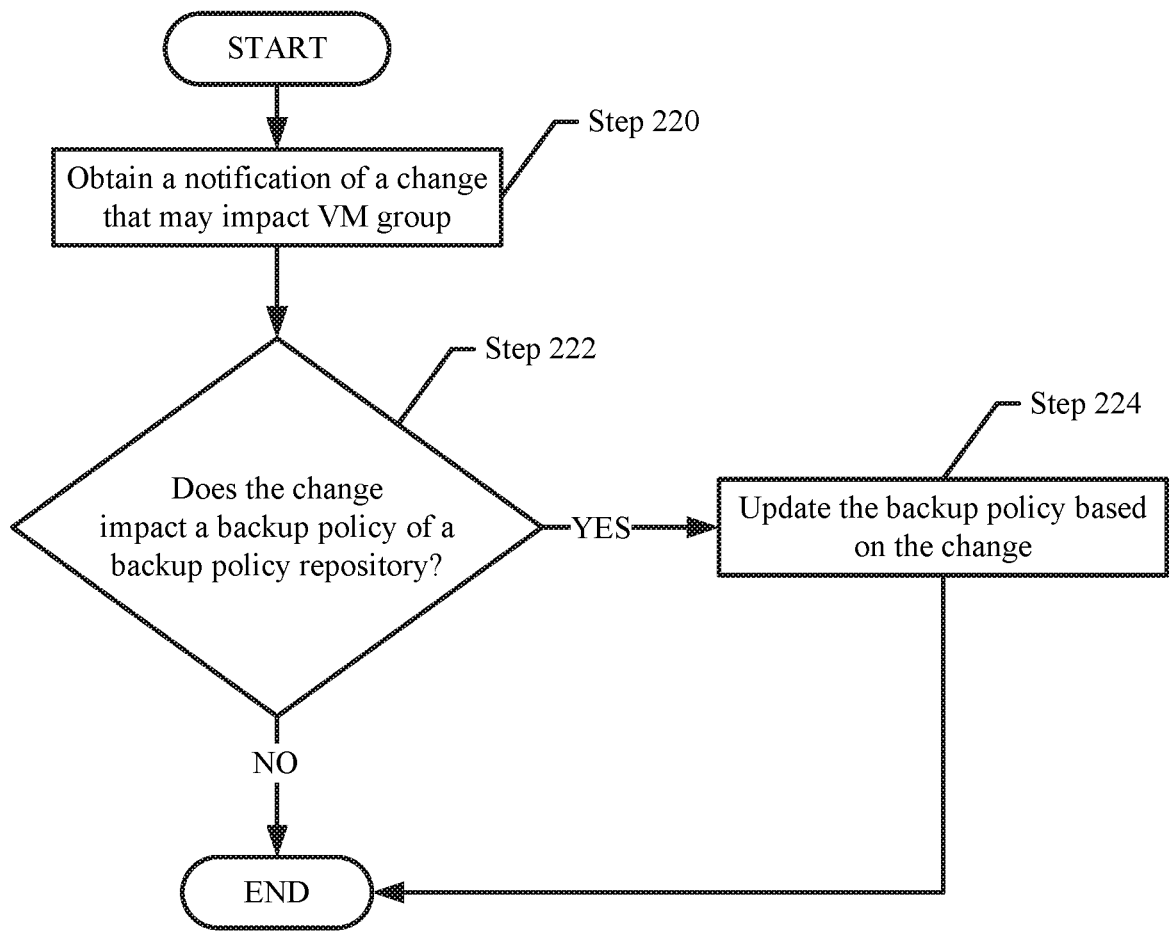
FIG. 2B shows a flowchart for managing a backup policy repository in accordance with one or more embodiments of the invention.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for performing a backup operation in accordance with one or more embodiments of the invention. The method shown in FIG. 2A may be performed by, for example, a data protection manager (100, FIG. 1A). Other components of the system illustrated in FIG. 1A may perform the method of FIG. 2A without departing from the invention.

In step 202, virtual machines (VMs) to back up are identified. In one or more embodiments of the invention, the virtual machine profiler queries the production hosts to identify the VMs on each of the production hosts. Once the VMs are identified, the virtual machine profiler obtains virtual machine information of the identified virtual machines. The virtual machine information may be obtained by sending information requests to the production hosts hosting the identified virtual machines and obtaining a response that includes virtual machine information.

In one or more embodiments of the invention, the virtual machine information may specify interdependencies between the virtual machines. For example, a first virtual machine may operate as long as a second virtual machine is operating. If the second virtual machine is, for example, quiesced, the first virtual machine may not operate. Subsequently, the virtual machine information may specify that the first virtual machine is dependent on the second virtual machine. In one or more embodiments of the invention, the virtual machine profiler may analyze the virtual machine information to determine whether there are any interdependencies between any of the identified VMs.

In step 204, the VMs are grouped into logical layers (also referred to as VM groups). In one or more embodiments of the invention, each virtual machine is associated with a logical layer or VM group. Each VM group may specify one or more virtual machines.

In one or more embodiments of the invention, the VMs are grouped into VM groups based on the obtained virtual machine information. The VM information may be used by the virtual machine profiler (or another component of the data protection manager) to determine a functionality for each virtual machine. The functionality is used to identify a logical layer associated with the VM. For example, a VM may be associated with VM information that specifies that the VM includes a database. The virtual machine profiler (or other component) may identify a logical layer that specifies a functionality associated with databases.

In one or more embodiments of the invention, the virtual machines may alternatively or additionally be grouped based on the interdependencies of the virtual machines. For example, for each identified virtual machine, any additional virtual machines that the identified virtual machine depends on are assigned to the same VM group as the identified virtual machine. In this manner, the VMs that depend on each other are backed up within a similar time frame.

In one or more embodiments of the invention, the VMs in a given VM group may be located on the same and/or on different production hosts.

In one or more embodiments of the invention, each VM group is associated with a backup policy. That backup policy associated with the VM group is the backup policy that is to be implemented all the virtual machines in the VM group. In one or more embodiments of the invention, a given VM group may be associated with multiple backup policies where each VM is associated with at least one of the backup policies. In this manner, different VMs within the same VM group may be backed up using different backup policies while still being scheduled in a manner that closely groups (as discussed below) the generation of the backups within the VM group.

In step 206, one or more production agents are configured to perform backup operations based on the VM groups. In one or more embodiments of the invention, an agent deployment manager of the data protection manager initiates a configuration of a production agent to be installed on a production host by assigning at least one VM group to the production agent. The agent deployment manager may configure the production agent to perform a backup of each VM of the VM group as specified by the backup policy(ies) associated with the VM group on a given production host. The agent deployment manager may communicate with the production host hosting the production agent when configuring the production agent.

In one or more embodiments of the invention, the backup policy may specify that additional agents are to be installed in a virtual machine in order to perform a backup on the virtual machine. For example, a Structured Query Language (SQL) application running on a virtual machine being backed up may require a SQL agent to be installed in the virtual machine prior to backup. The agent deployment manager may configure the production agent backing up the virtual machine to install the SQL agent on the virtual machine prior to initiating backup on the virtual machine.

In one or more embodiments of the invention, the production agents are configured to perform backups of more than one VM group. In this case, the production agents are further configured to back up the virtual machines in an order that maintains the VM groups. For example, for a production agent that is assigned to two VM groups, the production agent may be configured to not back up virtual machines of a second VM group until all of the virtual machines of a first VM group have been backed up. In this way, the time frames used to back up virtual machines of any particular VM group are as similar (or close in time) as possible.

In one or more embodiments of the invention, the production agent performing a backup of the VMs of a VM group is installed after the production agent has been configured as discussed above. In other words, the production agent is both configured and installed in the production host by the agent deployment manager.

In one or more embodiments of the invention, after the production agents are configured by the data protection manager, the production agents perform a backup of each respective virtual machine. The production agents may generate the backups in accordance with the configurations (as discussed above).

After generating the backups (also referred to as backup images), the production agents may configure a transport mode limit for transferring the backups to the backup storages. The transport mode limit may be set to a number that: (i) is not too high so as to exceed a maximum number of possible parallel transfers of backups to the backup storages based on the available network, and (ii) does not leave backups queued up so as to delay the transport time of the backups to the backup storages. If both criteria are unable to be met, the production agent may set the transport mode limit to a limit that meets criterion (i) of the aforementioned criteria.

After the transport mode limit has been set, the production agent may transfer the backups to the backup storages in parallel based on the transport mode limit. In this manner, the number of backups transferred at the same time does not exceed the configured transport mode limit.

FIG. 2B shows a flowchart for updating a backup policy repository in accordance with one or more embodiments of the invention. The method shown in FIG. 2B may be performed by, for example, a data protection manager (100, FIG. 1A). Other components of the system illustrated in FIG. 1A may perform the method of FIG. 2B without departing from the invention.

In step 220, a notification of an event that may trigger a change in a VM grouping is obtained. In one or more embodiments of the invention, the notification is obtained from a component of the production host (e.g., a hypervisor or a production agent) communicating with a virtual machine profiler of the data protection manager. The change specified in the notification may specify an addition or removal of a virtual machine in a production host.

In step 222, a determination is made about whether the change impacts the backup policy of a backup policy repository. In one or more embodiments of the invention, the data protection manager makes the determination for a change that specifies a removal of an entity (e.g., a virtual machine) by identifying one or more backup policies stored in the backup policy repository that specify the entity and determining whether the identified backup policies should be updated to not specify the removed VM.

In one or more embodiments of the invention, the data protection manager makes the determination for a change that specifies an addition of an entity (e.g., a virtual machine) by identifying a VM group to associate with the virtual machine, identifying one or more backup policies associated with the VM and/or VM group, and determining whether the identified backup policies should be updated to specify the added entity.

If the change impacts the identified backup policy (or policies), the method proceeds to step 224; otherwise, the method ends following step 222.

In step 224, the backup policy is updated based on the change. In one or more embodiments of the invention, the backup policy (or policies) are updated by: (i) adding an entity specified in the change to the backup policy (or policies) if the change specifies that an entity has been added to a production host, or (ii) removing an entity specified in the change from the backup policy (or policies) if the change specifies that an entity from the production host has been removed.

The updated backup policy may then be used by the agent deployment manager to update the configuration of one or more production agents.

In one embodiment of the invention, the addition of a new VM may also trigger other forms of updates to the configuration of one or more production agents. For example, consider a scenario in which there are two VM groups (VMG1, VMG2). Further, in this scenario assume that VMG1 includes: [VM1, VM2, VM4], and VMG2 includes: [VM3, VM5]. If VM6 is added to a production host and, based on an analysis of VM6, it is added to VMG2, then the production agent associated with VMG2 may be updated to backup VM6 based on either an existing backup policy associated with VMG2 or based on a backup policy associated with VMG2 after VM6 was assigned to VMG2.

Example

Figure 3A:
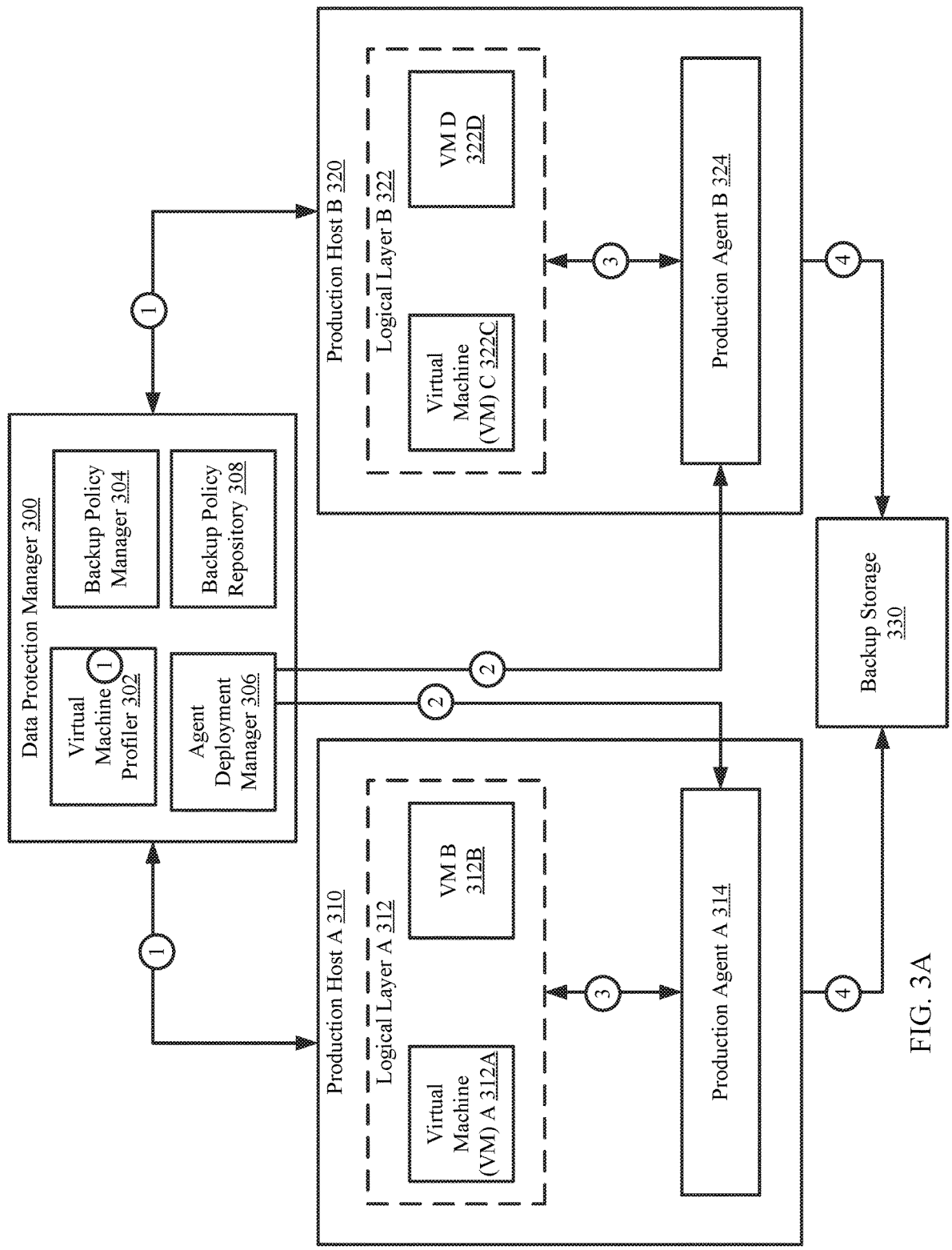
FIGS. 3A-3B show an example in accordance with one or more embodiments of the invention.
Figure 3B:
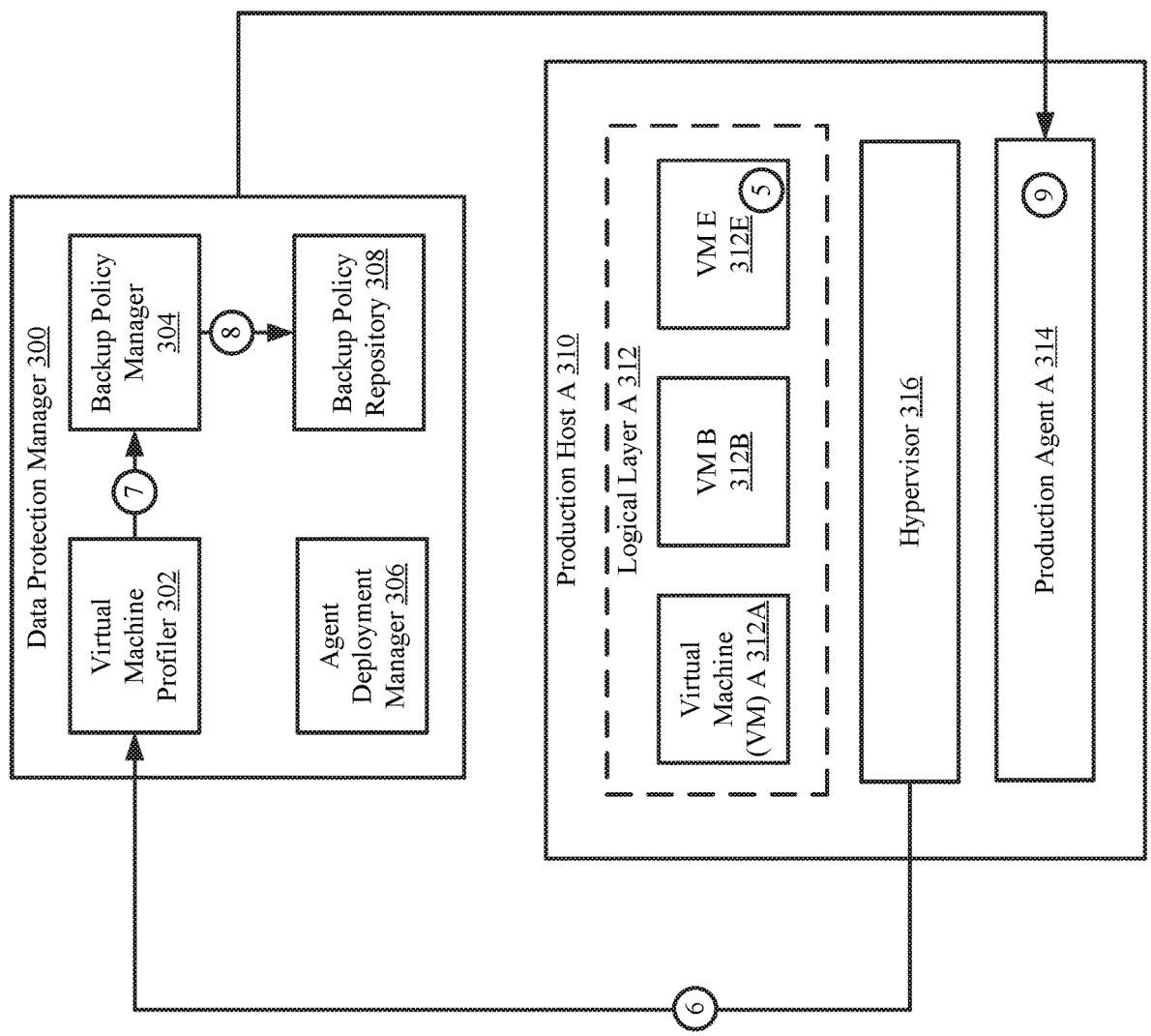

The following section describes an example. The example, illustrated in FIGS. 3A-3B, is not intended to limit the invention. Turning to the example, consider a scenario in which a system is performing a backup operation on virtual machines. The system may include a data protection manager (300). The data protection manager (300) may include a virtual machine profiler (302), a backup policy manager (304), an agent deployment manager (306), and a backup repository (308).

The virtual machine profiler (302) identifies virtual machines to be backed up. The virtual machines (VMs) to be backed up include VMs A, B, C, and D (312A, 312B, 322C, 322D). The virtual machine profiler (302) groups the VMs into logical layers using VM information associated with the aforementioned VMs [1]. The result of the group is logical layer A (312) that includes VM A (312A) and VM B (312B) and logical layer B (322) that includes VM C (322C) and VM D (322D).

The agent deployment manager (306) may configure a production agent (314, 324) on each production host (310, 320) to back up their respective VMs [2]. Production agent A (314) is configured to perform backups of the VMs in logical layer A (i.e., VMs A and B (312A, 312B)) and production agent B (324) is configured to perform backups of the VMs in logical layer B (i.e., VMs C and D (322C, 322D)) in accordance with a backup policy. Because the backup policy specifies that VM A and VM B (which are part of logical layer A (312)) are to be quiesced prior to generating a backup, production agent A (314) is configured to quiesce VMs A (312A) and B (312B) prior to generating a backup.

The production agents (314, 324) perform the backup operations on their respective VMs (312A, 312B, 322C, 322D) [3]. The backup operation performed by production agent A (314) includes quiescing the VMs (312A, 312B), taking backup of each respective VM (312A, 312B), and unquiescing the VMs (312A, 312B) after the backup generation is complete. The backup operation performed by production agent B (324) includes taking a backup of each respective VM (322C, 322D) without quiescing the VMs.

After the production agents (314, 324) generate the backups, the production hosts (310, 320) configure a transport mode by setting a session limit to 2 sessions per production host. In this manner, the backups of each VM is sent to a backup storage (330) at one time and reduces an amount of time used to back up the VMs (312A, 312B, 322C, 322D) without exceeding the computing resource capability of the production hosts (310, 320). After the transport modes are configured, the production hosts (310, 320) send the backups to the backup storage (330) using the transport modes.

At a later point in time, a new VM is introduced to the virtual machine system [5]. FIG. 3B shows a diagram with the data protection manager (300) and production host A (310). The production host (310), at this later point in time, includes the new VM (312E). A hypervisor (316) of the production host (310) sends a notification to the virtual machine profiler (302) that specifies the new VM [6]. The virtual machine profiler (302) subsequently obtains VM information for the VM (312E) from the production host and uses this information to associate VM (312E) with logical layer A. In addition, the virtual machine profiler (302) sends a second notification to the backup policy manager (304) about the new VM [7]. The backup policy manager (304), using the second notification, determines that a backup policy is to be associated with the VM. In this example, the backup policy manager (304) may, based on the VM information and/or the fact that VM (312E) is associated with logical layer A, update the backup policy associated with logical layer A to specify the new virtual machine (312E) is to be backed up in the same manner as the other VMs associated with logical layer A [8].

After VM (312E) has been associated with logical layer A and the corresponding backup policies are updated, the data protection manager initiates an update to the configuration of production agent A (314) such that VM (312E) is also backed up. [9]

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the efficiency of performing a backup operation by intelligently grouping virtual machines to be backed up based on a logical layer associated with each virtual machine. By intelligently grouping the VMs prior to generating the backups, embodiments of the invention are able to configure production agents to perform backups on virtual machines of a similar function and/or similar backup type. In this manner, the time used to back up a large number of virtual machines is reduced because each production agent is backing up multiple virtual machines in a way that uses the same amount of computing resources for each virtual machine.

Embodiments of the invention also improve the efficiency of implementing backup policies by automatically updating the backup policies based on changes to virtual machines. Embodiments of the invention, by automatically updating the backup policies, reduce the need for an administrator to manually update the backup policies. In a conventional implementation, the administrator may update the backup policies based on their experience with the changes to the system. Embodiments of the invention reduce the human error of updating backup policies that is caused by observing a system with a large number of virtual machines and not capturing every change that may impact the backup policies.

Thus, embodiments of the invention may address the problem of inefficient use of computing resources. This problem arises due to the technological nature of the environment in which backup policies are implemented.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for performing backup operations, the method comprising:
   identifying a plurality of virtual machines (VMs) to back up;
   grouping the plurality of VMs to obtain a plurality of VM groups, wherein grouping the plurality of VMs to obtain a plurality of VM groups comprises:
      obtaining virtual machine information for at least one of the plurality of VMs from the production host;
      wherein the grouping is performed using, at least in part, the virtual machine information,
      wherein the virtual machine information for at least one of the plurality of VMs specifies an interdependency between the at least one of the plurality of VMs and at least another one of the plurality of VMs; and
   initiating a configuration of a first production agent on a production host associated with a first VM group of the plurality of VM groups, wherein the first production agent initiates a backup operation on at least the first VM group after being configured.

2. The method of claim 1, further comprising:
   initiating a configuration of a second production agent on the production host associated with a second VM group of the plurality of VM groups, wherein the second production agent initiates a backup operation on at least the second VM group after being configured.

3. The method of claim 1, further comprising:
   initiating a further configuration of the first production agent on the production host associated with a second VM group of the plurality of VM groups, wherein a second production agent, after being configured, initiates a backup operation on the second VM group only after the backup operation for all VMs in the first VM group on the production host has been completed.

4. The method of claim 1, wherein initiating the configuration of the first production agent comprises:
   initiating installation of the first production agent on the production host; and
   initiating configuration of the first production agent to generate a backup of at least one of the plurality of VMs in the first VM group.

5. The method of claim 1, wherein a first VM in the first VM group is associated with a first backup policy and a second VM in the first VM group is associated with a second backup policy.

6. The method of claim 1, wherein the virtual machine information for the at least one of the plurality of VMs further specifies a function of the at least one of the plurality of VMs.

7. A system, comprising:
   a processor; and
   memory comprising instructions which, when executed by the processor, perform a method, the method comprising:
      identifying a plurality of virtual machines (VMs) to back up;
      grouping the plurality of VMs to obtain a plurality of VM groups, wherein grouping the plurality of VMs to obtain a plurality of VM groups comprises:
         obtaining virtual machine information for at least one of the plurality of VMs from the production host;
         wherein the grouping is performed using, at least in part, the virtual machine information,
         wherein the virtual machine information for at least one of the plurality of VMs specifies an interdependency between the at least one of the plurality of VMs and at least another one of the plurality of VMs; and
      initiating a configuration of a first production agent on a production host associated with a first VM group of the plurality of VM groups, wherein the first production agent initiates a backup operation on at least the first VM group after being configured.

8. The system of claim 7, the method further comprising:
   initiating a configuration of a second production agent on the production host associated with a second VM group of the plurality of VM groups, wherein the second production agent initiates a backup operation on at least the second VM group after being configured.

9. The system of claim 7, the method further comprising:
   initiating a further configuration of the first production agent on the production host associated with a second VM group of the plurality of VM groups, wherein a second production agent, after being configured, initiates a backup operation on the second VM group only after the backup operation for all VMs in the first VM group on the production host has been completed.

10. The system of claim 7, wherein initiating the configuration of the first production agent comprises:
    initiating installation of the first production agent on the production host; and
    initiating configuration of the first production agent to generate a backup of at least one of the plurality of VMs in the first VM group.

11. The system of claim 7, wherein a first VM in the first VM group is associated with a first backup policy and a second VM in the first VM group is associated with a second backup policy.

12. The system of claim 7, wherein the virtual machine information for the at least one of the plurality of VMs further specifies a function of the at least one of the plurality of VMs.

13. A non-transitory computer readable medium comprising computer readable program code, which when executed by a computer processor enables the computer processor to perform a method, the method comprising:
    identifying a plurality of virtual machines (VMs) to back up;
    grouping the plurality of VMs to obtain a plurality of VM groups, wherein grouping the plurality of VMs to obtain a plurality of VM groups comprises:

obtaining virtual machine information for at least one of the plurality of VMs from the production host;

wherein the grouping is performed using, at least in part, the virtual machine information, wherein the virtual machine information for at least one of the plurality of VMs specifies an interdependency between the at least one of the plurality of VMs and at least another one of the plurality of VMs; and initiating a configuration of a production agent on a production host associated with a first VM group of the plurality of VM groups, wherein the production agent initiates a backup operation on at least the first VM group after being configured.

14. The non-transitory computer readable medium of claim 13, the method further comprising:

initiating a configuration of a second production agent on the production host associated with a second VM group of the plurality of VM groups, wherein the second production agent initiates a backup operation on at least the second VM group after being configured.

15. The non-transitory computer readable medium of claim 13, the method further comprising:

initiating a further configuration of the first production agent on the production host based on a second backup policy associated with a second VM group of the plurality of VM groups, wherein a second production agent, after being configured, initiates a backup operation on the second VM group only after the backup operation for all VMs in the first VM group on the production host has been completed.

16. The non-transitory computer readable medium of claim 13, wherein initiating the configuration of the first production agent comprises:

initiating installation of the first production agent on the production host; and initiating configuration of the first production agent to generate a backup of at least one of the plurality of VMs in the first VM group.

\* \* \* \* \*